2,877,994

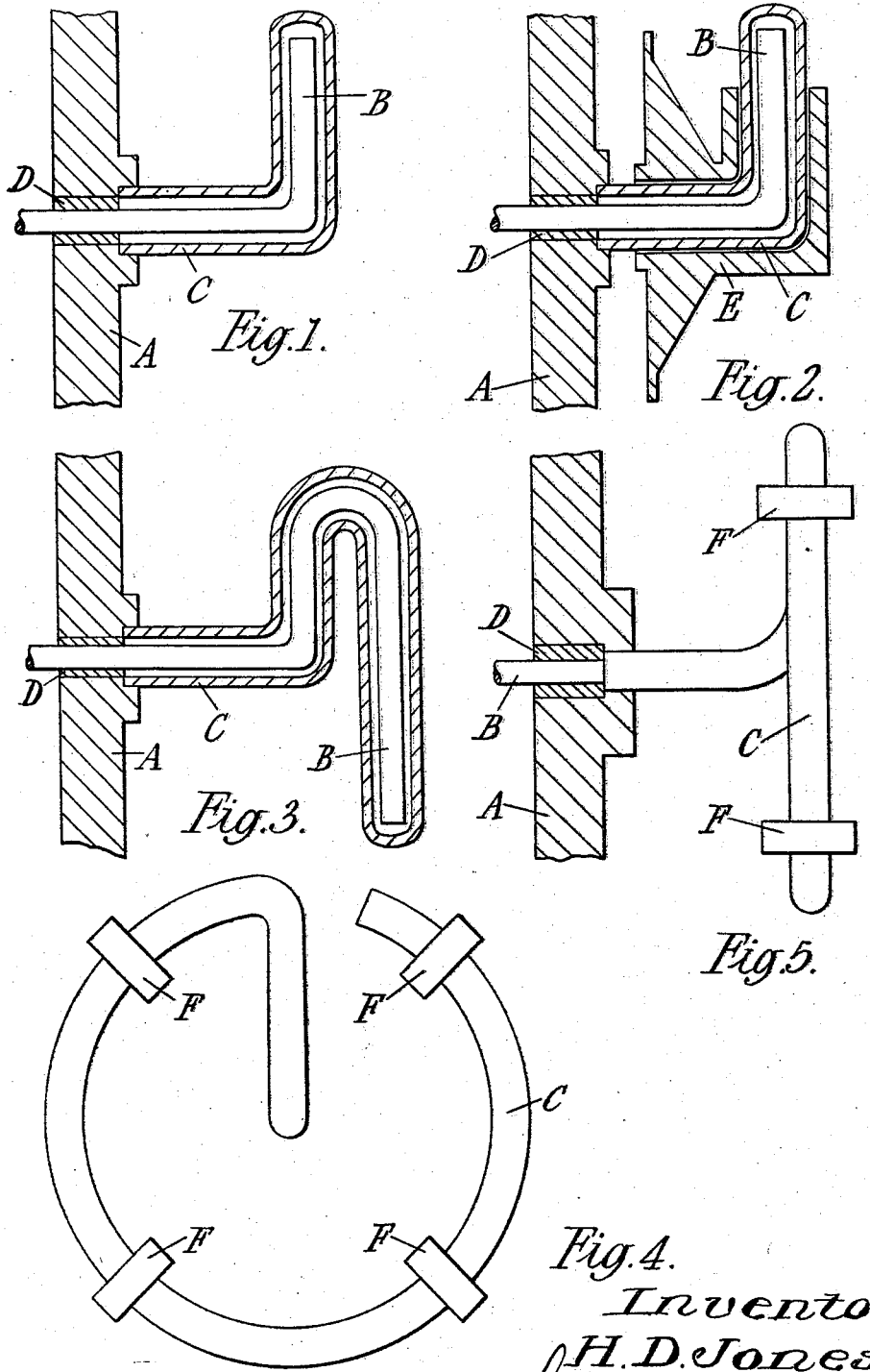

SEALING DEVICES FOR USE WITH ROTARY OR OSCILLATORY SHAFTS

Harold D. Jones, Port Talbot, South Wales

Application May 2, 1955, Serial No. 505,449

Claims priority, application Great Britain May 3, 1954

3 Claims. (Cl. 259—99)

This invention relates to improved sealing devices for shafts which transmit rotary or oscillatory motion under conditions in which it is important to avoid leakage along such shafts as for instance in pumps, agitating machines, fans, sealed chambers or the like.

An object of the invention is to ensure complete and satisfactory sealing of such a shaft in a reliable and simple manner when for some purpose a part, for example the driving end, of the shaft is inclined or cranked in relation to the remainder of the shaft.

According to the invention for sealing the bearing surfaces of a rotary or oscillatory shaft and a stationary support where a part of the shaft is cranked as aforesaid one end of the shaft is totally enveloped by a loosely fitting sleeve of flexible, torsionally resilient material the end of which is fixed to the stationary bearing support.

Obviously it is essential that the driving end of the shaft shall be free to revolve or twist within the sleeve without causing undue twisting or distortion of the sleeve. In practice the sleeve may twist or distort to some extent as the shaft revolves but provided that the rotational speed is not unduly high the sleeve periodically untwists itself notwithstanding continued rotation of the shaft.

Further and more specific objects will be apparent from the following description taken in connection with the accompanying drawings, in which:

Figure 1 is a fragmentary longitudinal cross-sectional view through a portion of the wall of a chamber illustrating a simple cranked shaft, Figure 2 is a view similar to Figure 1, but illustrating the shaft engageably connected with a pump rotor, Figure 3 is a view similar to Figure 1, but illustrating a modified form of shaft and sleeve arrangement, Figure 4 is a plan view of a further form of the shaft and sleeve arrangement, including impeller means, and Figure 5 is a view partly in end elevation and partly in section showing the arrangement of Figure 4 as mounted in a portion of the wall of a chamber.

In each of Figures 1 to 5 there is shown a turnable, that is, a rotary or oscillatory shaft B projecting through the wall or casing of a pump chamber A and supported by a stationary bearing element D. The end of the shaft within the chamber is cranked and enveloped by a loosely fitting closed sleeve C of flexible torsionally resilient material such as rubber or the like which is fixed at its open end in any suitable manner to the chamber A. The arrangement is such that the straight or driving portion of the shaft is capable of oscillating or rotary movement within the portion of the sleeve which surrounds the same. This portion of the sleeve does not rotate with the shaft but merely accommodates itself by slight flexing movement to the motion of the cranked end.

In the arrangement shown in Figure 2 the cranked end of the shaft B with the enveloping loosely fitting flexible torsionally resilient sleeve is driveably engaged with a pump rotor E whilst in the arrangement shown in Figure 3 the cranked end of the shaft is doubled back on itself so as to act, as a paddle or agitator for the liquid in the pump chamber.

In Figures 4 and 5 there is shown an arrangement in which the cranked end of the shaft is prolonged by a substantially circular extension lying in a plane perpendicular to the bearing axis. The whole of the cranked and extended part of the shaft is enveloped by the loosely fitting flexible sleeve C and circular discs F are secured to the flexible sleeve in any suitable manner so as to act as paddles or impeller blades when the shaft B is rotated, the flexible sleeve being fixed at one end to the bearing support D as hereinbefore explained. The flexible sleeve does not actually rotate and although twisted or distorted to some extent by being carried round by the shaft does periodically untwist itself notwithstanding continued rotation of the latter. The circular discs or impeller blades do however undergo a complete rotary movement.

It is clear, therefore, that the invention provides an arrangement in a liquid agitator which includes a turnable shaft extending through a wall of the chamber that has an intermediate cranked portion and a curved agitator portion at the end of the shaft. A flexible sealing sleeve fits loosely over the straight portion of the shaft, the intermediate cranked portion, and the agitator portion. This sleeve includes a closed end enveloping the free end of the agitator portion, and an open end securely fixed to the wall of the chamber. As shown in Figures 4 and 5, impeller means are fixed to the part of the sleeve that covers the curved agitator portion. Specifically, these blades constitute the discs F that are fixed to the sleeve and spaced therealong.

It should be understood that in any of the particular embodiments described and shown the flexible sleeve instead of being formed of resilient material such as rubber enveloping yet slidable relative to the shaft could be formed of flexible metal tubing suitably spaced from the shaft by means such as ball bearings to permit free rotation thereof.

It will be apparent that in all cases the inclined or cranked end portion of the shaft may be disposed inside or outside the chamber.

I claim:

1. In a liquid agitator, a shaft having a turnable portion extending through a chamber wall, an intermediate cranked portion extending from the turnable portion and a curved agitator portion extending from the cranked portion and having a terminal end, a flexible, torsionally resilient sealing sleeve fitting loosely over said turnable portion, said intermediate cranked portion and said curved agitator portion, said sleeve having a closed end enveloping the end of the curved agitator portion and an open end securely fixed to said wall, the turnable portion of said shaft being free to turn within said sleeve while the cranked end portions turn about the axis of the turnable portion with the sleeve accommodating this latter turning movement.

2. In a liquid agitator, a shaft having a turnable portion extending through a chamber wall, an intermediate cranked portion extending from the turnable portion, and a curved agitator portion extending from the cranked portion and having a terminal end, a flexible, torsionally resilient sleeve fitting loosely over said turnable portion, said intermediate cranked portion and said curved agitator portion, said sleeve having a closed end enveloping the end of the curved agitator portion and an open end securely fixed to said wall to seal the surfaces of said shaft extending through said chamber wall, the turnable portion of said shaft being free to turn within said sleeve while the cranked and agitator portions turn about the axis of the turnable portion with the sleeve accommodating this latter turning movement, and impeller blades fixed to the part of said sleeve covering said curved agitator portion.

3. In a liquid agitator, a shaft having a turnable portion extending through a chamber wall, an intermediate cranked portion extending from the turnable portion and a substantially circular agitator portion extending from the cranked portion and disposed in a plane perpendicular to the axis of the turnable portion, said agitator portion having a terminal end, a flexible, torsionally resilient sleeve fitting loosely over said turnable portion, said intermediate cranked portion and said substantially circular agitator portion, said sleeve having a closed end enveloping said agitator portion and an open end securely fixed to said wall, the turnable portion of said shaft being free to turn within said sleeve while the cranked and agitator portions turn about the axis of the turnable portion and the sleeve accommodating this latter turning movement, and agitator blades in the form of discs fixed and spaced along the flexible sleeve where said sleeve envelops said agitator portion.

References Cited in the file of this patent

UNITED STATES PATENTS 2,607,233   Bosch _____ Aug. 19, 1952